US007023429B2

(12) United States Patent
Katakami

(10) Patent No.: US 7,023,429 B2
(45) Date of Patent: Apr. 4, 2006

(54) TOUCH PANEL AND METHOD OF MAKING THE SAME

(75) Inventor: Seiki Katakami, Gunma (JP)

(73) Assignee: Hosiden Corporation, Osaka (JP)

( * ) Notice: Subject to any disclaimer, the term of this patent is extended or adjusted under 35 U.S.C. 154(b) by 362 days.

(21) Appl. No.: 10/424,058

(22) Filed: Apr. 25, 2003

(65) Prior Publication Data

US 2003/0201985 A1 Oct. 30, 2003

(30) Foreign Application Priority Data

Apr. 30, 2002 (JP) ............................ 2002-128359

(51) Int. Cl.
*G09G 5/00* (2006.01)

(52) U.S. Cl. .................................... 345/173; 178/18.01

(58) Field of Classification Search ........ 345/173–179; 178/18, 18.01–18.07
See application file for complete search history.

(56) References Cited

U.S. PATENT DOCUMENTS 5,750,940 A * 5/1998 Ito et al. .................. 178/18.05
2002/0000979 A1* 1/2002 Furuhashi et al. .......... 345/173

FOREIGN PATENT DOCUMENTS

JP 9146707 6/1997
JP 10133817 5/1998

* cited by examiner

*Primary Examiner*—Regina Liang
(74) *Attorney, Agent, or Firm*—David N. Lathrop, Esq.; Gallagher & Lathrop

(57) ABSTRACT

In a touch panel structure in which transparent conductive films 13 and 14 are formed on opposing surfaces of glass substrates 11 and 12 and electrodes 15 and 16 formed on one of the transparent conductive films are connected to lead-out patterns 23 and 24 formed on the other transparent conductive film forming surface, connecting portions 15*b*, 16*b* of the electrodes 15, 15 and connecting portions 23*b*, 24*b* of the lead-out patterns 23 and 24 are planar and do not overlap in their thick-wise direction but mate each other in adjacent but slightly spaced relation, and these slightly separated connecting portions are connected through conductive paste.

2 Claims, 5 Drawing Sheets

TOUCH PANEL AND METHOD OF MAKING THE SAME

BACKGROUND OF THE INVENTION

The present invention relates to a touch panel disposed on the front of a display for use as a switch integrated therewith and a method of making such a touch panel.

FIG. 1A schematically represents, in perspective, the touch panel disclosed in Japanese Patent Application Publication Gazette No. 9-146707. In FIG. 1A a glass-glass touch panel is shown with its resistance film coated top and bottom glass substrates separately. A top glass substrate 11 is thinner than a bottom glass plate 12, and these substrates 11 and 12 are coated all over their opposing surface areas with transparent conductive films 13 and 14, respectively.

The transparent conductive films 13 and 14 serve as resistance films, which are formed by ITO or like films. Along opposite sides of the transparent conductive films 13 and 14 are formed electrodes 15, 16 and 17, 18, respectively.

In this example the electrodes 17 and 18 associated with the transparent conductive film 14 are disposed along its opposite sides in the X direction, whereas the electrodes 15 and 16 are disposed along the opposite sides of the transparent conductive film 13 in the Y direction. The electrodes 15 and 16 are extended in the X direction to form connecting pails 15*a* and 16*a* as shown.

On the glass substrate 12 there are formed lead-out patterns 21 and 22 extended from the electrodes 17 and 18 of die transparent conductive film 14, and their extended end portions arranged in a blank area at one side of the glass substrate 12 to form connecting terminals 21T and 22T. In order that the voltage to be applied across die electrodes 15 and 16 on the glass substrate 11 may be supplied from the connecting terminals on the glass substrate 12, or tat die voltage detected across the electrodes 15 and 16 on the glass substrate 11 may be taken out to die connecting terminals on die glass substrate 12, connecting portions 23*a* and 24*a* are formed on the glass substrate 12 in opposing relationship to connecting portions 15*a* and 16*a* provided at one end of the electrodes 15 and 16 on die glass substrate 11. Extended from the connecting portions 23*a* and 24*a* are lead-out patterns 23 and 24, whose extended ends are arranged as connecting terminals 23T and 24T side by side with the connecting terminals 21T and 22T.

The connecting terminals 23T and 24T of the lead-out patterns 23 and 24 are arranged together with the connecting terminals 21T and 22T along one side of the glass substrate 12; an FPC cable or the like (not shown) for circuit connection is connected to the portion where the connecting terminals are located. On the transparent conductive film 14 of the glass substrate 12 there are formed in proper alignment a number of dot spacers 25. According to the aforementioned Japanese patent application publication gazette, the glass substrates 11 and 12 are, for instance 0.2 mm and 1.1 mm thick, respectively, and have 130-by-133-mm outer dimensions. The dot spacers 25 are formed by screen printing photo-setting resin all over the transparent conductive film 14; for example, the dot spacers are 10 to 30 μm in diameter, 2 to 8 μm and spaced 2 to 8 mm apart. Pressed by a pointed stick from above, the glass substrate 11 is curved between adjacent dot spacers 25, bringing the transparent electrodes 13 and 14 into contact with each other. A similar touch panel structure is also disclosed in Japanese Patent Application Publication Gazette No. 10-133817.

The glass substrates 11 and 12 of such configurations as described above are integrated into a one-piece structure with their transparent conductive films 13 and 14 opposed, by joining the substrates 11 and 12 along their marginal edges through use of a sealer 26 containing a spacer material. The seal 26 is a mixer of a thermosetting resin, such as a resin of the epoxy series, and a spacer material. The sealer 26 is coated on the glass substrate 12 along its marginal edge as shown, and the glass substrate 11 is placed on and pressed onto the glass substrate 12, followed by firing the substrate assembly, thereby joining together the two glass substrate 11 and 12 with a required gap defined therebetween.

In this case, the connecting portions 15*a* and 16*a* of the electrodes 15 and 16 on the glass substrate 11 and the connecting portions 23*a* and 24*a* of the lead-out patterns 23 and 24 on the glass substrate 12 are held opposite vertically to the glass substrates 11 and 12, and connected to each other by conductive paste. In consequence, it is possible to supply voltage to the electrodes 15 and 15 on the glass substrate 11 from the connecting terminals 23T and 24T on the glass substrate 12 or take out to the connecting terminals 23T and 24T the voltages in the electrodes 15 and 16.

A notched portion 26*a* in the sealer 26 deposited on the glass substrate 12 along its marginal edge is used as a port for injecting air into the gap between the glass substrates 11 and 12 to swell the central portion of the glass substrate 11 and hence widen the gap centrally thereof after they are joined together. After the air injection, the notched portion 26*a* is sealed using resin.

The touch panel of the above configuration is adapted so that when depressed at an arbitrary point on the panel surface, the transparent conductive films 13 and 14 are pressed into contact with each other at that point By applying voltage across the transparent conductive film 14 and detecting its potential via the transparent conductive film 13, the X coordinate of the point of depression can be detected. Similarly, the Y-coordinate of that point can be detected by applying voltage across the transparent conductive film 13 and detecting its potential via die transparent conductive film 14. In this way, the X-Y coordinates at the point of depression can be detected.

In the touch panel of the above construction, for example, the connecting portion 16*a* formed on the glass substrate 11 and the connecting portion 24*a* on the glass substrate 12 are disposed at positions where they overlap each other in a direction vertical to the glass substrates 11 and 12 (that is, in the direction thickwise of the connecting portions 16*a* and 24*a*) as shown in FIG. 1B. The connecting portions 15*a* and 23*a* are also similarly formed. The conventional touch panel has such disadvantages as mentioned below.

That is, the electrodes 15 to 18 and the lead-out patterns 21 to 25 are formed by print-coating and firing conductive paste such as a silver paste of conductive particles (silver particles) having a particle size of around 6 μm. The electrodes 15 to 18 and the lead-out patterns 21 to 24 thus formed are approximately 10 μm thick.

On the other hand, the gap G defined by the glass substrates 11 and 12 therebetween is about 9 μm in the peripheral region of the panel; therefore, in the regions where the connecting portions 15*a*, 16*a* and 23*a*, 24*a* overlap, the gap becomes inevitably wider, distorting the thin glass substrate 11 and hence causing the Newton's rings and, at worst, breaking the glass substrate 11. Further, the nonuniformity in the gap width also causes variations in the pressure for actuating the touch panel.

SUMMARY OF THE INVENTION

It is therefore an object of the present invention to provide a touch panel in which the lead-out patterns on the one transparent conductive film forming surface and the electrodes on the other transparent conductive film forming surface are connected without increasing the gap width, i.e., without introducing nonuniformity in the gap width, thereby preventing the problems such as breakage of glass substrates, occurrence of the Newton's rings and variations in the pressure for actuating the touch panel.

Another object of the present invention is to provide a method of making the above-mentioned touch panel.

According to the present invention, in a touch panel of the type wherein a transparent conductive film is formed almost all over one surface of either of a pair of glass substrates, the substrates are assembled with the transparent conductive films opposed each other, and electrodes on the one transparent conductive film surface are connected to lead-out patterns formed on the other transparent conductive film forming surface, interconnecting portions of the electrodes and the lead-out patterns are configured to mate each other, slightly separated, without overlapping in their width-wise direction.

In the touch panel manufacturing method of the present invention, a bridge, made of conductive paste, is extended outwardly from the top surface of each connecting portion of the one glass substrate, and the two glass substrates are fired after being placed one on the other and pressed into a one-piece structure with the extended portion of the bridge and the connecting portion of the other glass substrate overlap each other.

In the present invention, the both connecting portions may also be located on lands which are formed by the transparent conductive films on the transparent conductive film forming surfaces.

DETAILED DESCRIPTION OF THE PREFERRED EMBODIMENTS

Figure 1A:
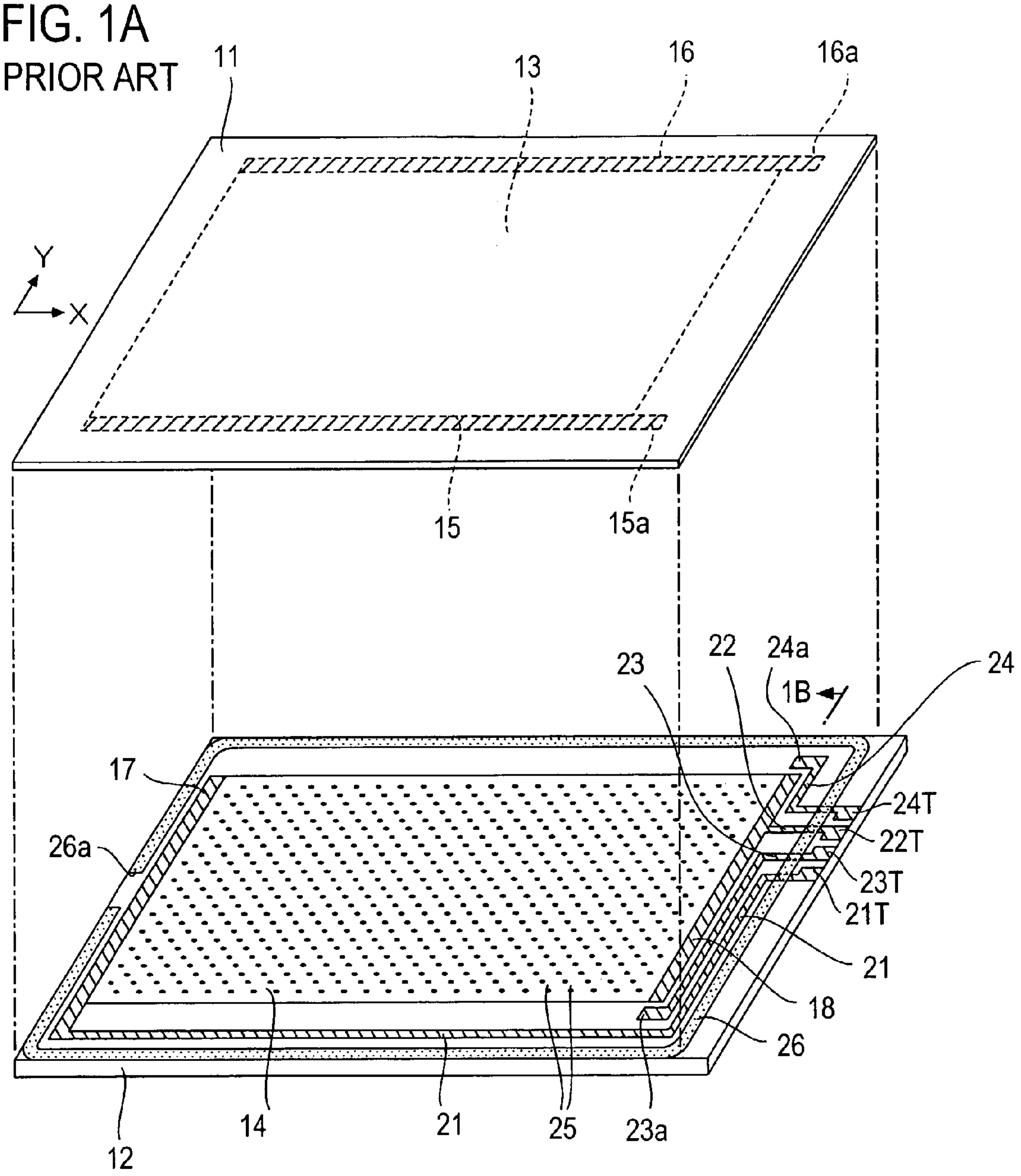
FIG. 1A is an exploded perspective view for explaining electrode connections of a conventional touch panel.
Figure 1B:
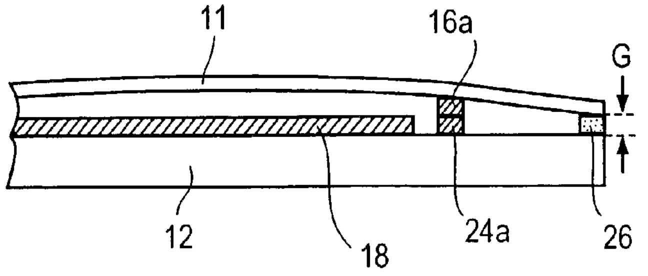
FIG. 1B is an enlarge sectional view showing connecting portions 15*a* and 23*a* and their neighborhood after joining glass substrates 11 and 12 in FIG. 1A.

With reference to the accompanying drawings, embodiments of the present invention will be described below. The parts corresponding to those in FIG. 1 are identified by the same reference numerals and no description will be repeated.

Figure 2:
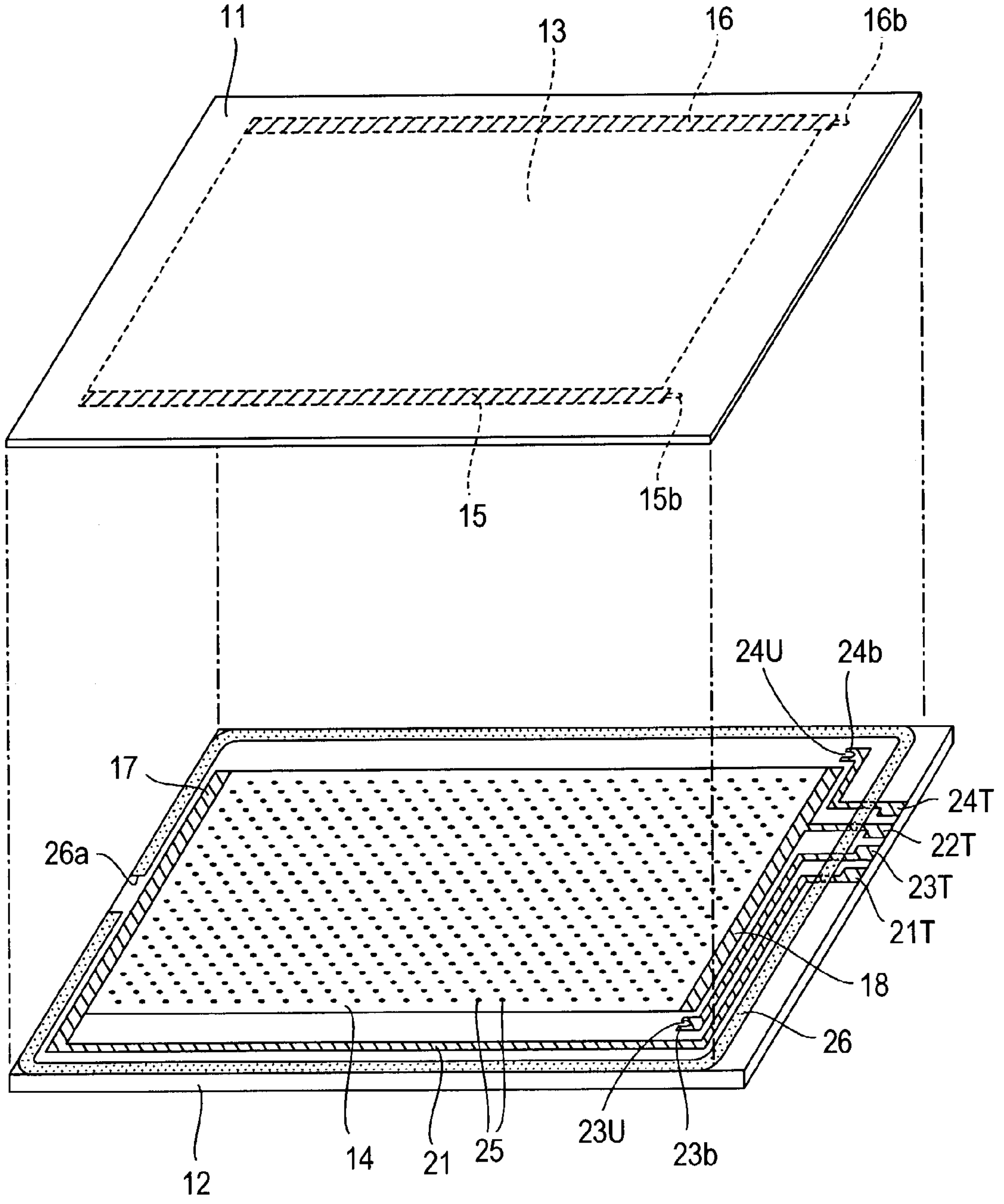
FIG. 2 is an exploded perspective view explanatory of an embodiment of the present invention.

FIG. 2 schematically illustrates an embodiment of the present invention, in which the connecting portions 23*b* and 24*b* of the lead-out patterns 23 and 24 formed on the glass substrate 12 have U-shaped notches 23U and 24U put in their tip end portions, respectively, whereas the electrodes 15 and 16 on the glass substrate 11 to be connected to the connecting portions 23*b* and 24*b* have tongue-like connecting portions 15*b* and 16*b* complementary to the U-shaped notches 23U and 24U, respectively. The connecting portions 15*b* and 16*b* are dimensioned to be narrower than the notches 23U and 24U to leave gaps between the connecting portions 15*b* and 16*b* and the inner marginal edges of the connecting portions 23*b* and 24*b*.

The connecting portions 23*b*, 24*b* and 15*b*, 16*b* are configured such that when the glass substrates 11 and 12 are joined together, the narrowed connecting portions 15*b* and 16*b* fit into the U-shaped notches 23U and 24U without overlapping in their thick-wise direction; that is, the connecting portions 23*b*, 24*b* and 15*b*, 16*b* are configured and dimensioned to mate each other with a slight gap g left therebetween.

Figure 3A:
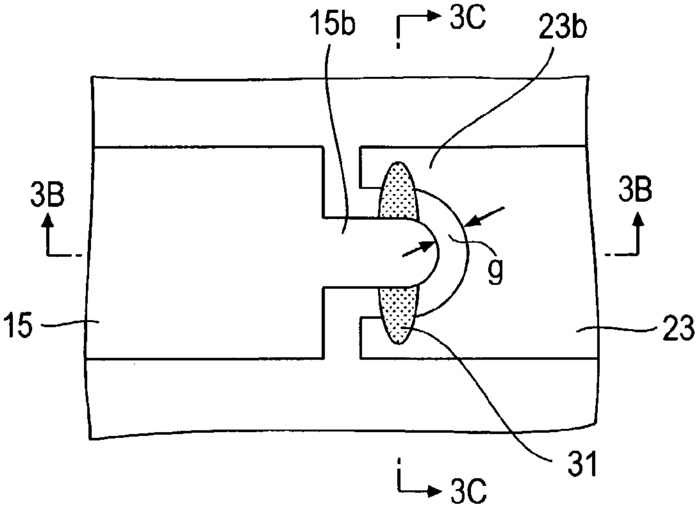
FIG. 3A is an enlarged sectional view illustrating the principal part of the FIG. 2 embodiment.
Figure 3B:
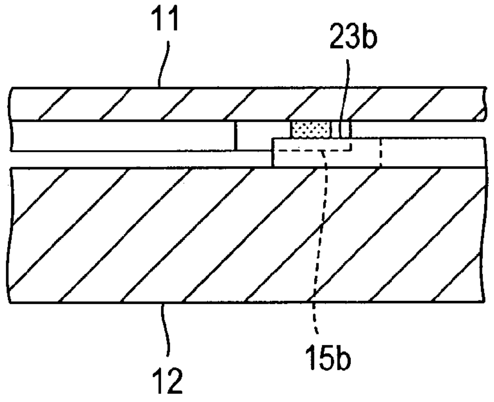
FIG. 3B is a sectional view taken along the line 3B—3B in FIG. 3A.
Figure 3C:
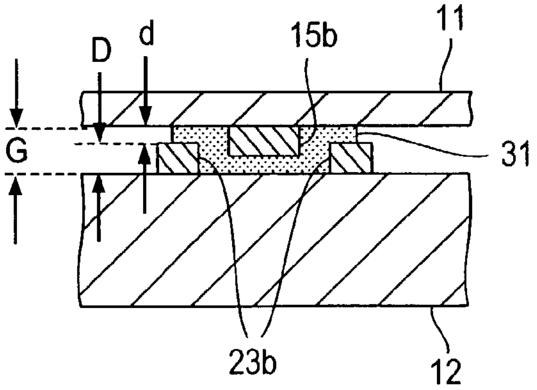
FIG. 3C is a sectional view taken along the line 3C—3C in FIG. 3A.

FIG. 3A is an enlarged plan view showing how the connecting portions 23*b* and 15*b* are connected, FIG. 3B is a sectional view taken along the line 3B—3B in FIG. 3A and FIG. 3C a sectional view taken along the line 3C—3C in FIG. 3A. The complementary connecting portions 23*b* and 15*b*, which are Separated by the slight gap g far smaller than the width of the electrode 15, are interconnected by a bridge 31 formed by a conductive paste. The bridge is made of silver paste, for instance. Prior to firing the substrate assembly, the glass substrates 11 and 12 are pressed together to spread out the sliver paste so that its thickness is smaller than those of the connecting portions 15*b* and 23*b*. Accordingly, as is evident from FIG. 3C, the gap G between the glass substrates 11 and 2 in this instance is the sum of the thickness d of the bridge 31 and the thickness D of the connecting portion 23*b* (or 15*b*). With this structure, the gap between the glass substrates 11 and 12 can be made smaller than in the case where the connecting portions 15*b* and 23*b* overlap in their thick-wise direction.

The connection of the connecting portions 23*b*, 24*b* and 15*b*, 16*b* by the conductive paste 31 and the joining of the glass substrates 11 and 12 are carried out by the following procedure, for instance.

(1) The sealer 26 mixed with a spacer material is screen-printed onto the glass substrate 12 as depicted in FIG. 2. On the other hand, the bridge 31 of conductive paste is screen-printed on the glass substrate 11 across the connecting portions 15*b* and 16*b* (the connecting portion 15*b* being shown in FIG. 3A which shows the pattern through the glass substrate 11).

(2) The glass substrates 11 and 12 are placed one on the other, then pressed, and fired.

The sealer 26 and the conductive paste forming the bridge 31 are simultaneously fired and hardened, by which the glass substrates 11 and 12 are jointed into a one-piece structure wherein the connecting portions 23*b*, 24*b* and 15*b*, 16*b* are mechanically coupled to establish electrical connections between them.

As described above, the connecting portions 15*b*, 16*b* and 23*b*, 24*b* are formed complementary to each other with no possibility of overlapping and are connected by the bridge 31 made of conductive paste; by pressing together the glass substrates 11 and 12 placed one on the other prior to firing, the thickness of the conductive paste used as the bridge 31 prior to hardening (see FIG. 3C) is minimized, ensuring uniformity in the gap G between the glass substrates 11 and 12 over the entire touch panel structure. By firing and hardening the conductive paste forming the bridge 31 in such a state, it is possible to connect the connecting portions 23*b*, 24*b* and 15*b*, 16*b* without widening the gap G between the substrates locally in the vicinity of the connecting portions.

Accordingly, the present invention permits reduction of nonuniformity in the gap G between the glass substrates 11 and 12 which occurs in the prior art example in which the connecting portions 15*a*, 16*a* and 23*a*, 24*a* overlap each other; hence, it is possible to prevent distortion of the glass substrate 11 which allows appearance of Newton's rings or breakage of the glass substrate 11. Further, it is possible to suppress variations in the load which is imposed on the panel structure by pressing the panel surface during manipulation.

Incidentally, if the transparent conductive films 13 and 14 are left unremoved on the glass substrates 11 and 12 to form lands in those areas where to locate the connecting portions 15*b*, 16*b* and 23*b*, 24*b*, it is possible to establish excellent and stable connections between the connecting portions 15*b*, 16*b* and 23*b*, 24*b*.

Figure 4A:
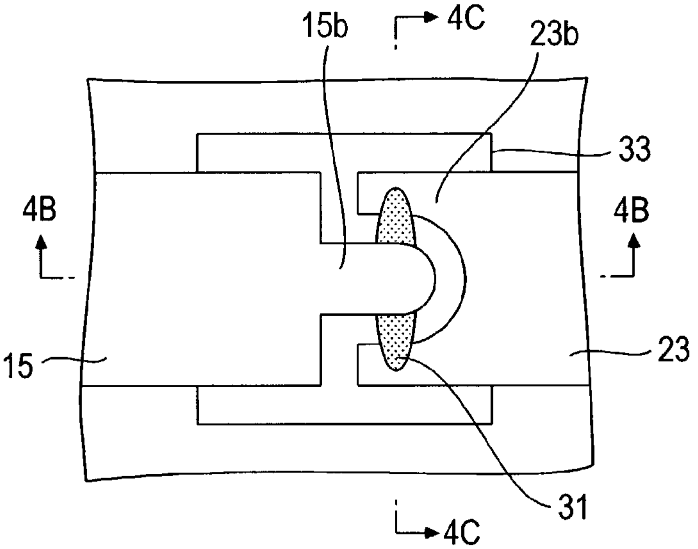
FIG. 4A is an enlarged plan view illustrating the principal part of another embodiment of the present invention.
Figure 4B:
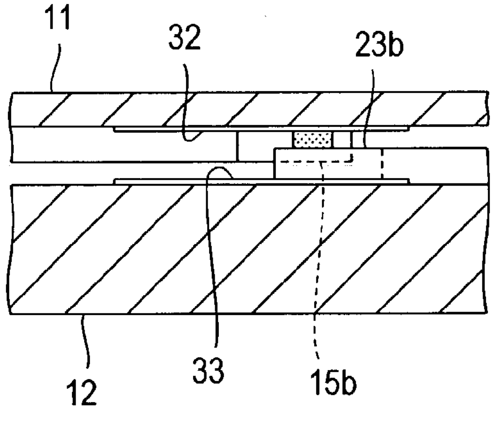
FIG. 4B is a sectional view taken along the line 4B—4B in FIG. 4A.
Figure 4C:
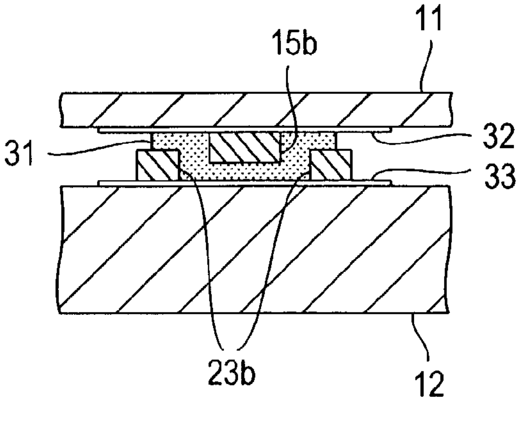
FIG. 4C is a sectional view taken along the line 4C—4C in FIG. 4A.

FIGS. 4A, 4B and 4C show the connection of the connecting portions 23*b* and 15*b* located on lands 33 formed by the transparent conductive films 13 and 14 left unremoved on the glass substrates 11 and 12.

Figure 5A:
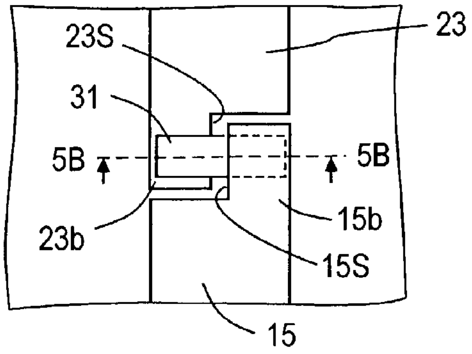
FIG. 5A is an enlarged plan view illustrating the principal part of another embodiment of the present invention.
Figure 5B:
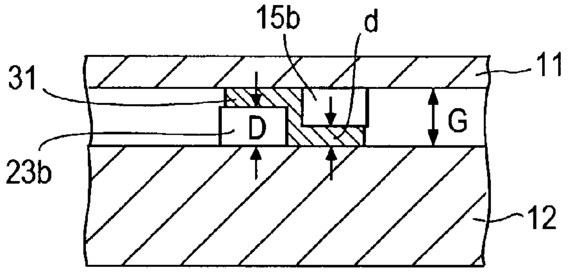
FIG. 5B is a sectional view taken along the line 5B—5B in FIG. 5A.

In the above embodiment the connecting portions 23*b* and 24*b* have the semicircular notches 23U and 24U and the connecting portions 15*b* and 16*b* are tongue-shaped members which are complementary to. the connecting portions 23*b* and 24*b*. FIGS. 5A and 5B illustrate a modification of the above embodiment, in which the connecting portions 23*b* and 15*b* are notched as indicated by 23S and 15S to form point-symmetrical or rotationally symmetrical stepped portions complementary to each other, and the remaining opposed projecting portions of the lead-out pattern 23 and the electrode 15 are used as connecting portions 23*b* and 15*b*, which are interconnected by the bridge 31 of conductive paste extended across them.

Figure 6A:
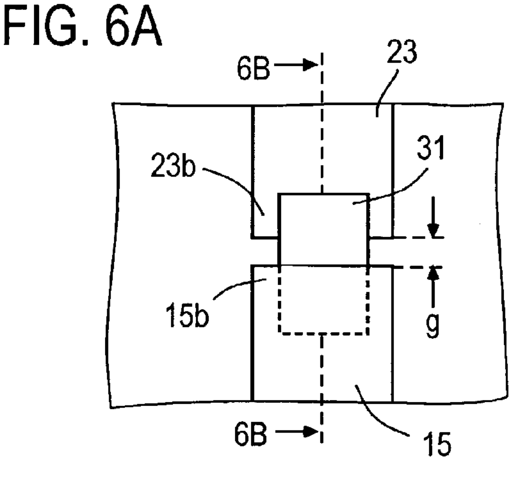
FIG. 6A is an enlarged plan view illustrating the principal part of still another embodiment of the present invention.
Figure 6B:
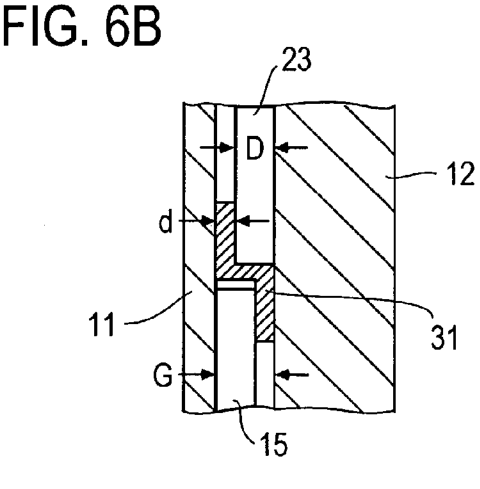
FIG. 6B is a sectional view taken along the line 6B—6B in FIG. 6A.
Figure 7:
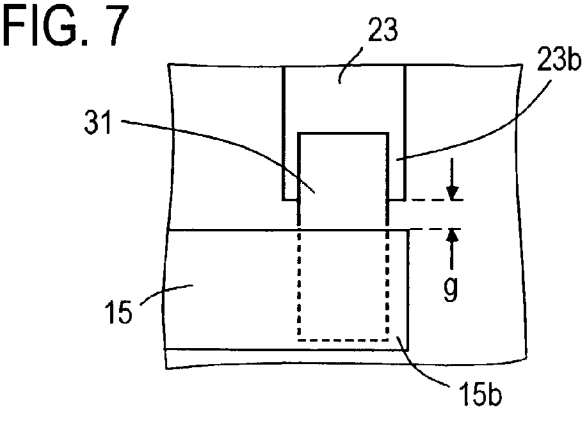
FIG. 7 is a plan view showing another example of the relative arrangement of the connecting portions and a bridge in FIG. 6A.

FIGS. 6A and 6B show another modification, in which the electrode 15 and the lead-out pattern 2 are disposed with their tip end portions held in parallel and separated by the gap g and interconnected by the bridge 31 extending across the gap. Alternatively, one side of the electrode 15 lengthwise thereof and the tip end portion of th lead-out pattern 23 are disposed opposite and separated by the gap g, and they are interconnected by the bridge 31 as depicted in FIG. 7.

At any rate, according to the present invention, the connecting portions 15*b*, 16*b* on the glass substrate 11 and the connecting portions 23*b*, 24*b* on the glass substrate 12 are formed so that they do not overlap in the direction vertical to the glass substrates 11 and 12 (in the direction thick-wise of the connecting portions 15, 16*b*) but form the gap g in the direction parallel to the substrate surface, and the conductive bridge thinner than the connecting portions is formed across them. Accordingly, the gap G between the glass substrates 11 and 12 can be made smaller than in the case where the connecting portions overlap as in the prior art—this provided increased uniformity in the gap G between the substrates.

EFFECT OF THE INVENTION

As described above, according to the present invention, the gap between the opposed glass substrates does not widen locally in the neighborhood of the portion for interconnecting the lead-out pattern formed on the one transparent conductive film forming surface and the electrode formed on the other transparent conductive film; that is, the gap does not become nonuniform. Accordingly, it is possible to overcome the problems of the prior art such as breakage of the glass substrates, occurrence of Newton's rings and variations in the pressure for actuating the touch panel.

What is claimed is:

1. A touch panel comprising:

opposing first and second glass substrates;

substantially rectangular first and second transparent conductive films formed opposite on the opposed surfaces of said first and second glass substrates;

a pair of first electrodes and a pair of second electrodes formed on said first and second transparent conductive films of said first and second glass substrates along their single pairs of opposite marginal edges, and first connecting portions each formed at one end of one of said pair of first electrodes, the direction in which said first electrodes are opposed being substantially at right angles to the direction in which said second electrodes are opposed;

a pair of first lead-out patterns each having at one end a pair of second connecting portions formed on said second glass substrate which do not overlap said first connecting portions in their thick-wise direction and are adjacent but separated therefrom by gaps in the direction parallel to the substrate surface, said pair of first lead-out patterns each having at the other end a pair of first terminals formed adjacent one marginal edge of said second glass substrate;

a pair of second lead-out patterns extended from said pair of second electrodes on said second glass substrate, extended end portions of said pair of second lead-out patterns being formed as a pair of second terminals adjacent said one marginal edge of said second glass substrate; and a pair bridges of conductive paste extending from the top surfaces of said first connecting portions to the top surfaces of said second connecting portions across said gaps; and lands formed by transparent conductive films on the opposing surfaces of said first and second glass substrates, wherein said first and second connecting portions are located on said lands.

2. A method of making a touch panel comprising the steps of:

(a) forming first and second transparent conductive films on opposing first and second glass substrates, forming a pair or first lands of transparent conductive film an the first glass substrate and forming a pair of second lands of transparent conductive film an the second glass substrate;

(b) forming a pair of first electrodes along a pair of opposite marginal edges of said first transparent con ductive film on said first glass substrate and forming a pair of second electrodes along a pair of opposite marginal edges of said second transparent conductive films on said second glass substrate, said pair of first electrodes having at each end a first connecting portion formed on the pair of first lands of transparent conductive film;

(c) forming on said second glass substrate a pair of first lead-out patterns having at one end a pair of second connecting portions and having at the other end a pair of first terminals adjacent one marginal edge of said second glass substrate and forming a pair of second lead-out patterns extended from said pair of second electrodes and having at the extended end portions a pair of second terminals adjacent said one marginal edge of said second glass substrate, wherein the pair of second connection portions are formed on the pair of second lands of transparent conductive film;

(d) forming a pair of bridges of conductive paste each extending form the top surface of one of said first connecting portion and beyond its marginal edge;

(e) bonding said first and second glass substrates be pressing them into a one-piece structure in which said second connecting portions each overlap the extended portion of one of said pair of bridges and are adjacent corresponding one of said pair of first connecting portions; and (f) firing said one-piece structure composed of said first and second glass substrates.

* * * * *